July 1, 1958 — D. E. SUNSTEIN ET AL — 2,841,704
SIGNAL INTEGRATING SYSTEM
Filed April 9, 1952 — 2 Sheets-Sheet 1

INVENTORS
DAVID E. SUNSTEIN
WILLIAM USSLER JR.
ALLEN C. MUNSTER
BY Brown, Denk & Lynnestvedt
AGENTS INVENTORS
DAVID E. SUNSTEIN
WILLIAM USSLER JR.
ALLEN C. MUNSTER
BY
Brown, Denk & Lynnestvedt
AGENTS

United States Patent Office 2,841,704
Patented July 1, 1958

2,841,704

SIGNAL INTEGRATING SYSTEM

David E. Sunstein, Bala-Cynwyd, William Ussler, Jr., Philadelphia, and Allen C. Munster, Hatboro, Pa., assignors to Philco Corporation, Philadelphia, Pa., a corporation of Pennsylvania Application April 9, 1952, Serial No. 281,414

21 Claims. (Cl. 250—27)

This invention relates to signal integrating systems and more particularly to systems for integrating a signal containing periodically recurring pulse series.

In a radar system, the video signal resulting from target reflected echoes consists of series of pulses which recur periodically at the repetition frequency of the radar system. Superimposed on this series of target reflected echo pulses is a random signal resulting from the combined effects of ground or sea clutter and noise signals generated within the receiver of the radar system. This random clutter signal makes it difficult if not impossible to detect small targets, for example a submarine snorkel, under normal or rough sea surface conditions by the use of non-integrating radar receivers.

Integrator circuits, commonly called "sweep integrators," have been developed for improving the signal-to-noise and the signal-to-clutter ratio of a radar system. Basically, a sweep integrator consists of a memory circuit, such as an ultrasonic delay line, with a controlled feedback circuit coupling the output of the memory circuit to the input thereof to form a recirculating signal loop. The delay time of the memory circuit is chosen to be equal to the radar pulse repetition period. Radar video signals are introduced into the recirculating signal loop where they are combined with previously introduced radar video signals. An output signal proportional in amplitude to a selected characteristic of the combined signal is derived from the recirculating loop.

Sweep integrators operate on the principle that the frequency distribution of a series of pulses representing target echoes is a line spectrum with the lines located at harmonics of the pulse repetition frequency whereas the spectrum of random noise and clutter signals is more or less uniformly distributed over the entire video passband. Periodic signals representing echoes from targets add linearly in the recirculating loop while aperiodic signals, resulting from clutter and thermal noise, add in the more gradual root mean square manner. As a result, the signal-to-noise and/or clutter ratio in the recirculating loop is greater than the corresponding ratio at the input to the recirculating loop. The improvement of the signal-to-noise and/or clutter ratio is a function of the number of successive target signals stored as a sum in the recirculating loop. In a typical application of the sweep integrator it may be desirable to store the sum of as many as 50 to 100 successive target signals within the recirculating loop. In order to achieve optimum storage of 50 to 100 successive target signals (based on the criterion of peak signal to R. M. S. noise) the feedback factor must be equal to .98 or .99. The feedback factor will approach the value 1 as the number of signals to be stored increases but will remain less than one for the storage of a finite number of signals.

The nature of an ultrasonic delay line is such that it is more convenient to delay a carrier signal modulated by video intelligence than it is to delay the video signal directly. For this reason previous sweep integrator circuits employed an amplitude-modulated carrier for storing intelligence within the recirculating loop. A typical amplitude-modulated sweep integrator circuit includes a delay line for delaying the amplitude-modulated carrier, an amplifier for amplifying the signal coming from the delay line, an amplitude-modulation detector, a signal adding circuit for adding present radar video signals to the output of the amplitude-modulation detector, an oscillator circuit, an amplitude-modulator circuit for modulating the signal from the oscillator with the output of the adding circuit and a driver amplifier coupling the output of the modulator circuit to the input of the delay line. The output of such an amplitude-modulated sweep integrator is taken from the output of the adding circuit. The modulation and the detection processes which take place every time the signal passes around the loop introduce distortion into the recirculating signal. Also, non-uniformity of frequency response in the amplifiers or in the delay line introduces distortion into the recirculating signal and tends to cause instability in the over-all operating characteristics of the sweep integrator. In an amplitude-modulated sweep integrator system, any distortions of the video signal or any amplitude nonlinearities which occur anywhere around the feedback loop, are exaggerated by the factor $$\frac{1}{1-F}$$

where F is the feedback factor of the recirculating loop. In a sweep integrator circuit having a gain of .95 the nonlinearities in the feedback loop would be exaggerated by a factor of 20. If the feedback factor is increased to .98 the nonlinearities in the feedback loop are exaggerated by a factor of 50. As a result, it has been found that the highest feedback factor which can be obtained in a practical amplitude-modulation sweep integrator is in the vicinity of .095. A sweep integrator having a feedback factor of .95 will store only 20 repetition periods.

It is an object of the present invention to provide a sweep integrator system in which the distortion of the video signal is substantially independent of the feedback factor of the recirculating loop.

A further object of the present invention is to provide a sweep integrator system having a greater stability than previously known systems.

Another object of the invention is to provide a sweep integrator circuit in which periodic modulation and demodulation of the recirculating signal is avoided.

More particularly, an object of the present invention is to provide a sweep integrator system having a stable feedback factor greater than 0.95.

Still another object of the invention invention is to provide a sweep integrator system in which the stored intelligence is substantially independent of the signal amplitude in the recirculating loop.

These and other objects of the present invention, which will appear as the description of the invention proceeds, are generally accomplished in a sweep integrator system employing a frequency-modulated signal in a recirculating loop. Such a frequency-modulated sweep integrator comprises generally a delay line, a feedback circuit coupling the output of the delay line to the input thereof with means in the feedback circuit for controllably changing the frequency of the recirculating signal. In the absence of any signal applied to the frequency changing means, the recirculating loop will oscillate at a substantially constant frequency. The frequency changing means is operative to shift the frequency of the recirculating signal by an amount proportional to the instantaneous amplitude of a signal applied thereto. This frequency shifted signal will travel around the loop and will reappear at the frequency changing means after an interval equal to the delay time of the delay line. The recirculating loop has an effective feedback factor of 1 for the stored intelligence since only the amplitude and not the frequency of the signal will be altered in passing around the loop. The feedback factor of the over-all integrator system is reduced to the desired value of .98 to .99 by providing an auxiliary low gain, degenerative loop including a frequency sensitive means for generating a signal proportional to the instantaneous frequency of the signal in the recirculating loop and applying this generated signal to the frequency changing means in a manner to cause a reduction in the frequency deviation of the recirculating signal. By causing this auxiliary loop to have a very low gain, for example 0.01 to 0.02, the effective feedback factor of the over-all system will be of the order of .99 to .98.

For a better understanding of the present invention reference should now be made to the following detailed description which is to be read in connection with the accompanying drawings, in which.

Figure 1:
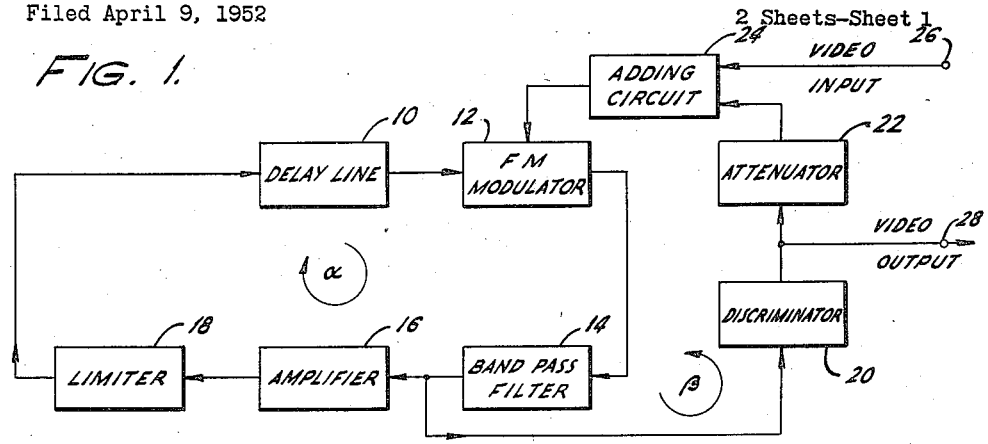
Fig. 1 is a block diagram of an embodiment of the present invention employing a single frequency changer in the recirculating loop.

In Fig. 1, the recirculating loop, having a feedback factor equal to unity, has been designated as the "alpha ($\alpha$) loop" while the low gain, degenerative loop has been designated as the "beta ($\beta$) loop." The arrows in Fig. 1 indicate the directions in which information travels in the system of Fig. 1.

The alpha loop of Fig. 1 includes a delay line 10 having a delay time equal to the repetition period of the periodic signal to be integrated. If the embodiment of Fig. 1 is to be used as a sweep integrator in a radar system, delay line 10 will have a delay time equal to the pulse repetition period of the radar system. Coupled to the output of delay line 10 is a frequency modulator 12. Frequency modulator 12 may be any of a number of well known circuits that are operative to shift the frequency of a signal passing therethrough by an amount proportional to the instantaneous amplitude of a video signal applied thereto. For example, frequency modulator 12 may be a conventional phase modulator system which produces an instantaneous frequency displaced from a reference or carrier frequency by a frequency interval that is a function of the amplitude of the modulating signal. Frequency modulator 12 preferably includes an integrating circuit preceding the modulating circuit so that the displacement of the instantaneous frequency from the frequency of the recirculating signal is proportional to the amplitude of the modulating signal rather than proportional to the differential of the modulating signal as is the case in conventional phase modulator circuits. This system is known as the Armstrong system of frequency modulation and is more fully described in 24 Proceedings of the I. R. E. 689, May 1936.

The output of frequency modulator 12 is supplied through a band-pass filter 14 to the input of an amplifier 16. Band-pass filter 14 has a passband characteristic as shown in Fig. 1A which is a plot of gain versus frequency.

Figure 1A:
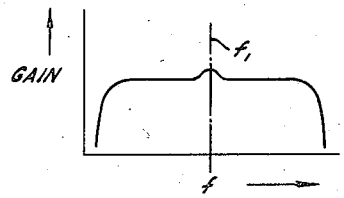
Fig. 1A is a plot showing the gain versus frequency characteristic of one element of the embodiment of Fig. 1.

As shown in Fig. 1A, filter 14 has a maximum gain (lowest attenuation) at a frequency $f_1$. The gain of filter 14 drops rather sharply on either side of frequency $f_1$ and then remains substantially constant over a rather wide passband. The characteristic shown in Fig. 1A may be obtained by including, in a conventional band-pass filter circuit, one or more high Q circuits resonant at the frequency $f_1$. For example, the band-pass filter 14 may comprise five amplifier stages which have tuned coupling circuits therebetween. The desired characteristic shown in Fig. 1A can be achieved by stagger tuning these stages in a conventional manner and selecting the coupling circuit of the middle stage to have a higher Q than the other four. In general, the ratio of the gain of filter 14 at frequencies slightly displaced from frequency $f_1$ to the gain at frequency $f_1$ should be equal to or greater than the over-all feedback factor of the system in order that the signal in the recirculating loop will stabilize at the frequency $f_1$. The output of amplifier 16 is coupled to the input of delay line 10 through a short time constant video limiter 18.

The alpha loop will oscillate at a substantially constant amplitude at frequency $f_1$ since the gain around the alpha loop is held at unity for this frequency by the action of limiter 18 and filter 14. The alpha loop will not sustain continuous oscillations at frequencies other than $f_1$ since the gain around the loop is made less than unity at these frequencies by the greater attenuation of filter 14 at frequencies displaced from $f_1$. Two gains must be considered in connection with any consideration of the alpha loop. One gain is the gain for the intelligence circulating in the alpha loop. This gain is always equal to unity for the alpha loop since the intelligence is carried by a shift in frequency of the recirculating signal and is independent of the amplitude of the recirculating signal. The second gain is the amplitude gain of the recirculating signal. This gain must have an average value of approximately unity in order that a signal may be continuously recirculated in the alpha loop. It is the gain for the intelligence that is reduced by the action of the beta loop.

The output of filter 14 is also coupled to a frequency discriminator 20 having a center or zero output frequency $f_1$. Discriminator 20 is coupled through a signal attenuator 22 to one input of signal adding circuit 24. It will be apparent as the description of the invention proceeds that the peak in the characteristic of filter 14 is not essential to the proper operation of the present invention since discriminator 20 also helps to stabilize the frequency circulating in the alpha loop at the frequency $f_1$. Adding circuit 24 is coupled to modulator 12 and supplies the modulating signal thereto. The video signal to be integrated is applied to a second input 26 of adding circuit 24. Adding circuit 24 may take the form of two video amplifier stages with a common anode load impedance, the control signal for one amplifier being supplied from input 26 and the control signal for the other amplifier being supplied from attenuator 22. Attenuator 22 is provided to reduce the gain of the beta loop to the desired low value. The output signal is derived from the output of discriminator 20 at terminal 28.

The operation of Fig. 1 may be explained as follows. In the absence of a video signal at terminal 26, the signal in the alpha loop will be a constant amplitude, constant frequency signal. The frequency of this signal will be the frequency $f_1$ of Fig. 1A. If a single video pulse is applied at terminal 26, modulator 12 will cause the frequency of the signal in the alpha loop to shift for the duration of the applied pulse by an amount proportional to the amplitude of the applied pulse. This frequency shifted signal will pass through band-pass filter 14, amplifier 16, limiter 18 and delay line 10 and will reappear at modulator 12 after a time interval determined by the delay time of the alpha loop. If no other pulses are applied at terminal 26, this frequency shifted signal will continue to circulate around the alpha loop with the difference between the frequency of this signal and the frequency $f_1$ diminishing slightly each time the signal makes one complete circuit around the alpha loop. This decrease in the frequency deviation is caused by the feedback provided by the beta loop. When the frequency shifted signal appears in the output of band-pass filter 14, discriminator 20 will have an output, the polarity of which is dependent upon the direction of the excursion from frequency $f_1$ and an amplitude proportional to the amplitude of the excursion. The output of discriminator 20 is passed through attenuator 22 and applied to adding circuit 24. Attenuator 22 is adjusted so that the signal applied to adding circuit 24 will cause a frequency excursion opposite in direction to and from .01 to .02 times the amplitude of the original frequency excursion. The delay around the beta loop is extremely small so that the degenerative signal provided by the beta loop is applied to modulator 12 at the time that the original frequency excursion is passing through modulator 12. Therefore, the action of the beta loop will be to cause a small decrease in the original frequency excursion each time this frequency shifted signal passes around the alpha loop. It should be noted that this action of the beta loop will also tend to stabilize the frequency of the alpha loop at the frequency $f_1$. That is, if the frequency of the circulating signal should depart from the center frequency of discriminator 20 for a long interval rather than momentarily, modulator 12 will respond to the continuous signal from the beta loop and will shift the frequency of the recirculating signal in the direction of frequency $f_1$.

If the signal applied at terminal 26 is a pulse which recurs periodically at intervals equal to the delay time of delay line 10, adding circuit 24 will supply a signal to modulator 12 tending to cause an additional frequency excursion in the recirculating signal each time the original frequency shifted signal reappears at modulator 12. The net result will be that a single frequency shifted signal continues to circulate around the alpha loop but the amplitude of the excursion measured from frequency $f_1$ is increased on each trip around the alpha loop by the periodic signal applied at terminal 26 and decreased each trip by the degenerative signal derived from the beta loop. An equilibrium condition will be reached in which the amplitude of the degenerative signal supplied by the beta loop is exactly equal to the periodic signal applied at terminal 26. If the signals applied at terminal 26 vary in amplitude, the amplitude of the frequency excursion in the alpha loop will follow this change in amplitude of the applied signal after a slight time delay. If the signal applied at terminal 26 is a periodically recurring series of pulses rather than a periodically recurring single pulse, there will be several frequency shifted signals circulating in the alpha loop at one time. The time intervals between these frequency shifted signals at any point in the alpha loop will be equal respectively to the time spacings of the corresponding pulses in the signal applied at terminal 26. For example, if the pulse series consists of three pulses spaced 20 microseconds apart and the repetition period of the pulse series is 1000 microseconds, at any point in the alpha loop there will be one frequency shifted signal followed by a second signal 20 microseconds later and a third signal still another 20 microseconds later. Then no frequency shifted signal will appear at this point for 960 microseconds. Aperiodic signals applied at terminal 26 will also cause frequency excursions in the alpha loop but these frequency excursions will soon die out owing to the fact that they are attenuated by the beta loop without receiving reinforcement from signals applied at terminal 26. As will be seen from the above discussion, adding circuit 24 may be either an adding or a subtracting circuit depending upon the polarity of the output of discriminator 20. However, the combined action of discriminator 20 and adding circuit 24 must be such as to cause the beta loop to supply a degenerative signal to the alpha loop.

Figure 2:
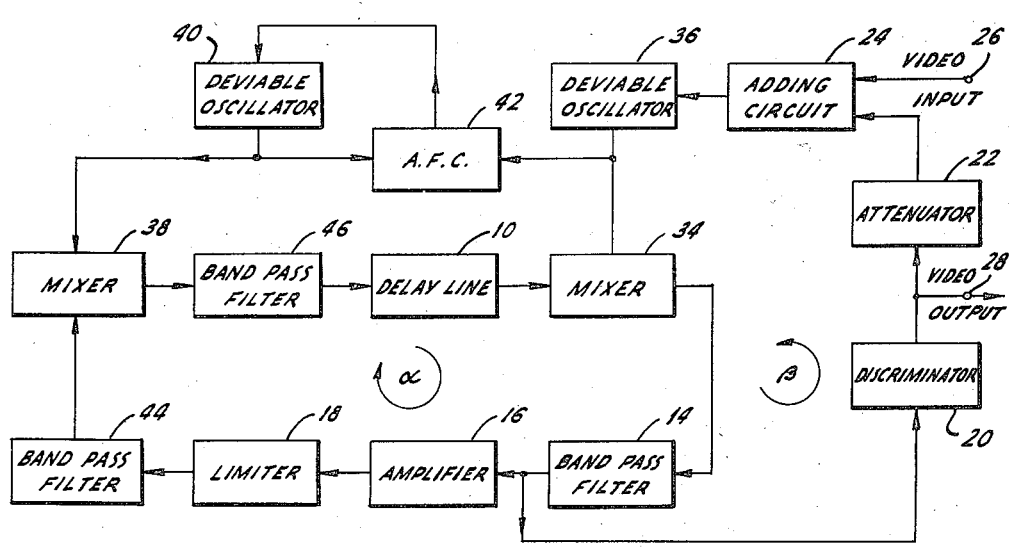
Fig. 2 is a block diagram of a preferred embodiment of the invention employing multiple heterodyning in the recirculating loop.

The embodiment of the invention shown in Fig. 2 operates on the same general principle as the embodiment of Fig. 1 but differs from the embodiment of Fig. 1 in the manner of introducing a frequency excursion into the alpha loop. The frequency modulator 12 of Fig. 1 is replaced in Fig. 2 by a heterodyne mixer 34 and a deviable oscillator 36. Adding circuit 24 is coupled to deviable oscillator 36 in a manner to control the frequency of this oscillator. Oscillator 36 may include a reactance tube or any one of a number of other well known means responsive to the signal from adding circuit 24 to deviate the frequency of the oscillator by an amount proportional to the instantaneous amplitude of the applied signal. Mixer 34 is inserted in the alpha loop between delay line 10 and band-pass filter 14. Since the signal from deviable oscillator 36 will either raise or lower the frequency of the recirculating signal in the alpha loop even in the absence of a signal at terminal 26, it is necessary to compensate for this change in average frequency at some other point in the alpha loop. In Fig. 2, this compensation is provided by a mixer 38 inserted in the alpha loop between limiter 18 and delay line 10. A second deviable oscillator 40, having the same average frequency as oscillator 36, is coupled to mixer 38. An automatic frequency control (AFC) circuit 42 is coupled to the outputs of oscillators 36 and 40 to insure that the average frequency of oscillator 40 remains exactly equal to the undeviated frequency of oscillator 36. The output of automatic frequency control circuit 42 is coupled back to oscillator 40 to adjust the frequency of this oscillator to correct for any frequency drift. Automatic frequency control circuits for performing the functions outlined above are well known in the frequency modulation art where they are used to maintain the average frequency of the deviated oscillator equal to the frequency of a crystal controlled standard frequency.

Band-pass filters 44 and 46 are inserted before and after mixer 38, respectively, in order to eliminate undesired sideband or heterodyne signals. Filter 44 has a characteristic similar to filter 14 with or without the peak at frequency $f_1$. Filter 46 has a passband equal in width to the passband of filters 14 and 44 but centered about a frequency equal to $f_1$ increased or decreased by the frequency of oscillator 40.

Additional amplifiers (not shown) may be inserted in the alpha loop before and/or after delay line 10. If such additional amplifiers are inserted, the gain of amplifier 16 should be decreased in order to maintain a gain of approximately unity around the alpha loop. The action of limiter 18 will reduce the gain of the loop to unity. In an actual physical embodiment of the invention, filters 14, 44 and 46 may form the input or output circuits of various amplifiers and mixers in the alpha loop.

It is believed that the understanding of the invention in general and of the embodiment of Fig. 2 in particular will be facilitated by assigning specific values to the frequencies appearing in the embodiment of Fig. 2. These assigned values serve only to illustrate the invention and do not in any way set limits of frequencies within which the invention will operate.

Let it be assumed that the alpha loop has a natural frequency of oscillation of 7 mc. measured at the input of amplifier 16. In this case, band-pass filters 14 and 44 will have a pass-band centered at 7 mc. Oscillator 40 may have any suitable frequency of oscillation, for example 11 mc. The frequency of the signal in the output of mixer 38 will be the sum of 11 mc. and 7 mc. plus or minus any frequency excursion resulting from applied video signals. Therefore, band-pass filter 46 will have a passband centered at approximately 18 mc. Oscillator 36 should have an undeviated frequency of approximately 11 mc. so that the difference in frequency between the signal at the output of delay line 10 and the signal from oscillator 36 will again be 7 mc. The proper frequency relationship between oscillators 36 and 40 is maintained by automatic frequency control circuit 42 as described above. Discriminator 20 has a center frequency equal to the natural frequency of the alpha loop, in this example a frequency of 7 mc. Discriminator 20 will act to hold the oscillation frequency at the assumed frequency of 7 mc. Assume now that the alpha loop of Fig. 1 is oscillating at its natural frequency of 7 mc. and that no information is stored within the alpha loop. Assume further that a pulse having a time duration short compared to the delay time of delay line 10 is applied at input 26 of adding circuit 24. The signal from adding circuit 24 will cause a shift in the frequency of oscillator 36 for the duration of the input pulse. Let it be assumed that the pulse shifts the frequency of oscillator 36 by .08 mc. to a frequency of 11.08 mc. The output of mixer 34 will be shifted for the duration of the input pulse to a frequency of 6.92 mc. This shifted frequency is well within the pass-band of filters 14 and 44 so that the signal at the shifted frequency is coupled around the alpha loop to mixer 38. The signal in the output of mixer 38 will be equal to 6.92 mc. plus 11 mc. or 17.92 mc. for the duration of the applied pulse. The signal in the output of delay line 10 will continue at 18 mc. until the signal at the frequency of 17.92 mc. passes down the delay line and appears at the output. If a single pulse is applied at terminal 26, the frequency of oscillator 36 will again be at 11 mc. when the signal at 17.92 mc. appears in the output of delay line 10. The frequency of the signal in the output mixer 34 will then be equal to 17.92 minus 11 mc. or 6.92 mc. Except for the action of the beta loop, this signal at 6.92 mc. would be continuously recirculated around the alpha loop. To reduce the feedback factor of the alpha loop so that signals are stored for only 50 to 100 trips around the alpha loop, a signal is supplied from the output of band-pass filter 14 to discriminator 20. Discriminator 20 is operative to produce an output pulse in response to the momentary frequency excursion of the signal in the alpha loop. The polarity of this pulse in the output of discriminator 20 is opposite to that of the pulse originally applied at input 26. This pulse from discriminator 20 is attenuated in attenuator 22 to an amplitude approximately 1/50 the amplitude of the original pulse applied at input 26. The application of the attenuated signal to adding circuit 24 causes the frequency of oscillator 36 to shift to a frequency below 11 mc. by an amount equal to the original shift of .08 mc. divided by the factor 50 or .0016 mc. Therefore the frequency of oscillator 36 will be approximately 10.9984 mc. This decrease in frequency of oscillator 36 will result in a corresponding increase in the signal at filter 14 from 6.92 mc. to 6.9216 mc. As the frequency shifted signal representing the original pulse continues to recirculate in the alpha loop, the deviation from frequency $f_1$ will gradually decrease until there is no detectable frequency shifted signal stored in the loop.

Assume now that the initial pulse has been applied at input 26 and that the frequency shifted signal has passed around the loop and has appeared at the output of delay line 10. If a second pulse, equal in amplitude to the first pulse, is applied at input 26, this second pulse will cause the frequency of oscillator 36 to again increase to a frequency of approximately 11.08 mc. The signal in the output of mixer 17 will now be the difference between 17.92 mc. and 11.08 mc. or 6.84 mc. This frequency shifted signal which has a time duration equal to the time duration of the input pulses will again pass around the recirculating loop and appear in the output of delay line 10 as a frequency of 17.84 mc. If a third pulse, still of the same amplitude, is applied at input 26, the frequency in the output of mixer 34 will decrease by an additional .08 mc. to 6.76 mc. The action of the beta loop will reduce slightly the deviations given in this example but the reduction will be comparatively small for only three pulses.

It can be shown mathematically that the maximum decrease in frequency in the output of mixer 34 for a series of pulses of uniform amplitude applied at input 26 will be equal to approximately $$\frac{1}{1-F}$$

where F is the effective feedback factor around the alpha loop, which in this case is equal to the feedback factor of the alpha loop minus the feedback factor of the beta loop. If $F=.98$ and if a single pulse produces a deviation of .08, the maximum deviation in frequency at the output of mixer 34 will be 4 mc. measured from the natural frequency of 7 mc.

The video output signal at terminal 28 is derived from the output of discriminator 20 and will have an amplitude proportional to the maximum frequency deviation in the output of mixer 34. The amplitude of the random noise and clutter signal will be greater at the output of discriminator 20 than at input 26 but by a factor much less than 50. Therefore, the signal-to-noise and/or clutter ratio in the output of the sweep integrator will be higher than the signal-to-noise and/or clutter ratio at input 26 by as much as 10 to 20 db.

As suggested above, various modifications may be made in the circuit of Fig. 2 without altering the basic principles of operation of the circuit. For example, one or more of band-pass filters 14, 44 and 46 may be omitted. Furthermore, amplifiers may be included before and after delay line 10 in order to obtain the desired signal levels at these points in the alpha loop. It will be remembered that the amplitude of the signal in the alpha loop is not a critical factor since the information is stored as a change in frequency of the recirculating signal rather than as a change in amplitude. Attenuator 22 may also be combined with the output circuit in the discriminator 20 or with the input circuit of adding circuit 24.

Figure 3:
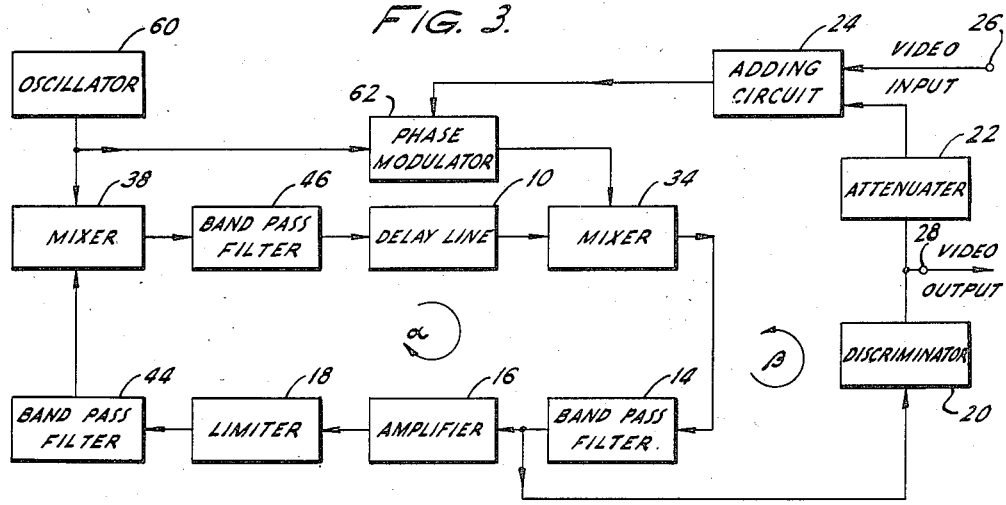
Fig. 3 is a block diagram of a third embodiment of the present invention in which the signals applied to the two mixers in the recirculating loop are derived from the same oscillator.

The alpha loop in the system of Fig. 3 is identical to the alpha loop in the embodiment of Fig. 2. However, in Fig. 3 a single oscillator 60 is employed for supplying signals to mixers 34 and 38. The signal to mixer 34 is passed through a phase modulator 62 which produces sideband frequencies displaced from the frequency of oscillator 60 by an amount proportional to the amplitude of the signal applied to modulator 62 from adding circuit 24. The signal from adding circuit 24 may be passed through an integrator circuit (not shown) before it is applied to phase modulator 62 so that the deviated frequencies generated in modulator 62 are displaced from the frequency of oscillator 60 by a frequency interval directly proportional to the amplitude of the signal in the output of adding circuit 24.

Figure 4:
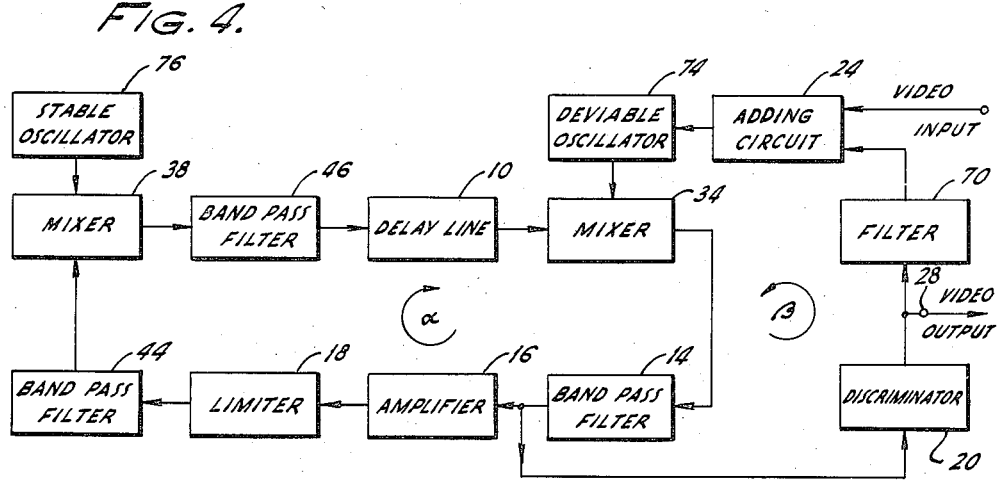
Fig. 4 is an embodiment of the present invention in which automatic frequency control of one of the oscillators is provided in the degenerative feedback loop.

The embodiment of the invention illustrated in Fig. 4 again employs the same elements in the alpha loop as does the embodiment of Fig. 2. However, the beta loop of Fig. 4 includes a filter 70 having a gain versus frequency characteristic as shown by the curve 72 in Fig. 4B. Filter 70 replaces attenuator 22 since the attenuation of filter 70 at frequencies above some low value, for example 10 cycles per second, is equivalent to the attenuation provided by attenuator 22. The attenuation of filter 70 at frequencies below 10 cycles is very low compared to the attenuation at frequencies above 10 cycles per second. Therefore, a very large feedback signal is supplied to adding circuit 24 for frequencies from zero to 10 cycles per second. Any slow shift in the frequency of deviable oscillator 74 such as would occur with thermal drift will result in a relatively large signal being applied to adding circuit 24 in a direction to equalize the frequencies of oscillator 74 and oscillator 76. This high feedback factor at low frequencies acts to maintain the average frequency of deviable oscillator 74 exactly equal to the frequency of oscillator 76. In the paragraph above it has been assumed that the frequency of the alpha loop remained exactly equal to the center frequency of discriminator 20. If the assumption is now made that the oscillators 76 and 74 are operating at exactly the same frequency but that the natural frequency of the alpha loop has drifted from the center frequency of discriminator 20, it will be seen that the frequency of operation of oscillator 74 will be shifted slightly to restore the frequency of the signal at the output of filter 14 to the center frequency of the discriminator. Therefore the beta loop acts to maintain the circulating signal at the proper value despite changes in the natural frequency of the alpha loop and/or changes in the frequency of operation of oscillators 74 and 76. The shape of the characteristic of the filter 70 at low frequencies will have very little effect on the video signals in the beta loop since the amplitude of such low frequency components in the video signal is extremely small.

Figure 4B:
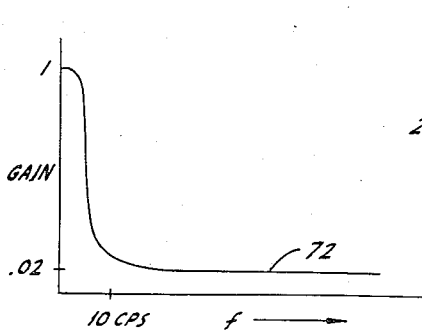
Fig. 4B is a curve showing the frequency response characteristic of the filter network of Fig. 4A.
Figure 4A:
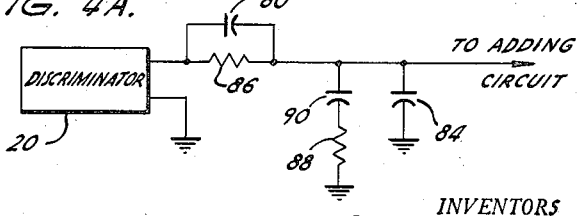
Fig. 4A is a schematic diagram of a filter network in the degenerative loop.

Fig. 4A illustrates a filter circuit having the gain versus frequency characteristic shown in Fig. 4B. In Fig. 4A, capacitors 80 and 84 may be the distributed capacitances of the circuit elements. The capacitance of capacitor 84 should be approximately 200 times the capacitance of capacitor 80. Series resistor 86 is selected to have a resistance equal to approximately 200 times the resistance of resistor 88. Capacitor 90 is chosen so that a frequency response drops off as shown in Fig. 4B.

In the four embodiments of the invention described above the modulation and demodulation processes are confined to the beta loop. Since the gain of the beta loop is always small and degenerative, the distortion and nonlinearities introduced into the integrator system by the modulator and demodulator circuits are essentially the same as would be obtained by passing the input directly through these two elements once without any feedback. In addition, the distortion in the output does not tend to increase as the number of recirculations of the information in the alpha loop is raised. In the frequency-modulated integrators described above, the gain of the video signal in the alpha loop does not tend to vary with varying parameters since the intelligence is stored in the alpha loop as a change in frequency. For the same reason, the amplitude of the signal in the alpha loop may vary within reasonable limits without adversely affecting the operation of the sweep integrator. More specifically, the gain tolerances of the alpha loop are no more severe than are those in a standard video amplifier. This is to be contrasted with the situation which prevails in amplitude-modulated sweep integrators where loop gain changes of only a few percent may cause an amplitude-modulated sweep integrator to oscillate and become useless.

The invention is not limited in its application to sweep integrator systems for use in conjunction with radar detection systems. The present invention will find application wherever it is desired to detect a periodically recurring signal in the presence of a random signal having an amplitude equal to or greater than the amplitude of the periodic signal. In many cases the embodiments described above may be employed without modification to integrate signals derived from systems other than a radar system. In other instances any modification of the input circuit that is required to adapt the embodiments described above to such differing applications will be obvious to one skilled in the art. It can be shown that the over-all gain versus frequency characteristic of each of the systems described above is identical to the gain versus frequency characteristic of a "comb filter." That is, the gain of the system is high for signals having a repetition period equal to the delay time of the delay line and for harmonics of such signals. The gain is low for frequencies other than those mentioned above. It can be shown further that the gain versus frequency characteristic of the filter may be altered to cause the gain peaks to occur at odd multiples of a signal having a period equal to one-half the delay time of the delay line by causing mixers 38 and 34 in Fig. 2, for example, to shift the frequency of the signals passing therethrough in the same direction. That is, if the signal in the output of mixer 38 has a frequency equal to the sum of the frequencies of the signals from oscillator 40 and band-pass filter 44, then the signal in the output of mixers 34 will have a frequency equal to the sum of the frequencies of the signals from oscillator 36 and delay line 10. It will be remembered that in the embodiment described above, the signal in the output of mixer 34 had a frequency equal to the difference of the frequencies of the applied signals. This modification of the system of Fig. 2 will result in a shift in the sign of the deviation of the recirculating signal from the natural frequency of oscillation of the system each time the signal makes a trip around the loop. Otherwise the operation of the modified system is much the same as that of the system of Fig. 2. Therefore, while there have been described what are presently considered to be preferred embodiments of the present invention, the scope of the present invention is to be determined solely by the limits established by the hereinafter appended claims.

We claim:

1. A sweep integrator system comprising a recirculating signal loop including a delay means and having an over-all gain of unity, said system including means for causing a signal at a substantially constant frequency to be circulated in said loop, means for causing a shift in the frequency of said recirculating signal dependent upon an instantaneous characteristic of the signal to be integrated, a degenerative auxiliary loop coupled to said recirculating loop, said degenerative loop causing the effective intelligence feedback factor of said recirculating signal loop to have a value less than unity, and means for deriving an output signal from said recirculating signal loop.

2. A sweep integrator system comprising a recirculating signal loop, said loop including a delay means for causing signals circulating in said loop to have a predetermined transit time around said loop, said loop including means for causing a signal at a substantially constant frequency to be circulated in said loop, means for causing a shift in the frequency of said circulating signal proportional to the instantaneous amplitude of an applied signal, means coupled to said loop for generating a signal having an instantaneous amplitude proportional to the instantaneous frequency of said recirculating signal at the point of coupling, signal combining means coupled to said signal generating means and the source of said signals to be integrated and means coupling the output of said signal combining means to said frequency shifting means to control the operation of the latter.

3. A system for integrating a periodically recurrent signal, said integrating system comprising delay means having a delay time equal to the period of said signal, a feedback circuit coupling the output of said delay means to the input thereof, thereby to form a recirculating signal loop, means forming a part of said feedback circuit for normally maintaining an approximately constant amplitude recirculating signal in said loop, said signal normally having a predetermined fixed frequency, frequency changing means also forming a part of said feedback circuit, said frequency changing means being operative to cause the frequency at a point in said loop to shift by an amount proportional to the instantaneous amplitude of a signal applied thereto, means coupled to said loop for generating an output signal proportional to the instantaneous deviation from said predetermined frequency of the frequency at the point of coupling to said loop, means for additively combining the output signal of said last-mentioned signal generating means and said signal to be integrated, said signal combining means being coupled to said frequency changing means to control the frequency thereof.

4. A system for integrating a periodically recurrent signal, said integrating system comprising delay means having a delay time equal to the period of said signal, a feedback circuit coupling the output of said delay means to the input thereof, thereby to form a recirculating signal loop, means forming a part of said feedback circuit for normally maintaining an approximately constant amplitude recirculating signal in said loop, said signal normally having a predetermined fixed frequency, frequency changing means also forming a part of said loop, said frequency changing means being operative to cause the frequency at a point in said loop to shift by an amount proportional to the instantaneous amplitude of a signal applied thereto, means coupled to said loop for generating an output signal proportional to the instantaneous deviation from said predetermined frequency of the frequency at the point of coupling to said loop, a signal adding circuit, means coupling the output signal from said last-mentioned signal generating means to a first input of said signal adding circuit, means for coupling said signal to be integrated to a second input of said signal adding circuit, and means coupling the output of said signal adding circuit to the input of said frequency changing means.

5. A system for integrating periodically recurrent pulse series, said integrating system comprising delay means having a time delay equal to the time spacing between corresponding pulses in successive pulse series, a feedback circuit coupling the output of said delay means to the input thereof, thereby to form a recirculating signal loop, means forming a part of said feedback loop for normally maintaining an approximately constant amplitude recirculating signal in said loop, frequency sensitive means associated with said loop and constructed and arranged to cause said signal normally to have a fixed predetermined frequency, the period of one cycle of said signal being short compared to the delay time of said delay means, pulse operated frequency changing means also forming a part of said signal loop, said frequency changing means being operative to cause the frequency at a point in said loop to shift by an amount proportional to the amplitude of a pulse applied to said frequency changing means, the duration of said frequency shift at said point being equal to the duration of said pulse, frequency sensitive means coupled to said loop, said frequency sensitive means being operative to generate an output signal proportional to the instantaneous deviation from said fixed frequency of the frequency at the point of coupling to said loop, a signal adding circuit, means coupling the output of said frequency sensitive means to a first input of said signal adding circuit, means for supplying the signals to be integrated to a second input of said signal adding circuit, and means for supplying output from said signal adding circuit to the input of said frequency changing means.

6. A system for integrating periodically recurrent signals, said integrating system comprising a delay means having a delay time which bears a predetermined relationship to the period of said signals, a frequency changing means, a band-pass filter having a lesser attenuation at one frequency within the passband thereof than at other frequencies within said passband, and an amplifier, the above-named elements being connected in a series loop, said series loop being operative to generate a recirculating, oscillatory signal of approximately constant amplitude at the frequency of least attenuation of said filter, the period of said signal being short compared to the delay time of said delay line, means for supplying the signal to be integrated to said frequency changing means to control the operation thereof, said series loop having a feedback factor of unity for information stored as a shift in frequency of said recirculating signal, means coupled to said loop for generating an output signal proportional in amplitude to the instantaneous deviation from said frequency of least attenuation of the frequency at the point of coupling to said loop, and means for supplying a portion of said output signal degeneratively to said series loop, thereby to reduce the effective feedback factor of said loop to a value less than unity.

7. A system for integrating periodically recurrent signals, said integrating system comprising a delay means having a delay time which bears a predetermined relationship to the period of said signals, a frequency changing means, a band-pass filter having a lesser attenuation at one frequency within the passband thereof than at other frequencies within said passband, and an amplifier, the above-named elements being connected in a series loop, said series loop being operative to generate a recirculating oscillatory signal of approximately constant amplitude at the frequency of least attenuation of said filter, the period of said signal being short compared to the delay time of said delay line, means coupled to said loop for generating an output signal proportional in amplitude to the instantaneous deviation from said frequency of least attenuation of the frequency at the point of coupling to said loop, a signal adding circuit, means for supplying output signal from said last-mentioned signal generating means to a first input of said signal adding circuit, means for supplying said signals to be integrated to a second input of said signal adding circuit, and means for supplying output from said signal adding circuit to the input of said frequency changing means, said frequency changing means being operative to cause the frequency of a signal passing therethrough to shift by an amount proportional to the instantaneous amplitude of a signal applied thereto.

8. A signal integrating system as in claim 7 wherein said signal supplied to said first input of said signal adding circuit causes said frequency changing means to shift said frequency passing therethrough in a direction to reduce said deviation of said frequency at the point of coupling to said loop, said reduction in deviation being small compared to the total deviation in frequency of said signal at said point of coupling.

9. A system for integrating a composite signal which includes a periodically recurrent series of pulses, said integrating system comprising a delay means having a delay time equal to the time interval between corresponding pulses in successive pulse series, frequency changing means, a band-pass filter having a frequency of least attenuation approximately in the center of the passband thereof, an amplifier a limiter, the above-mentioned elements being connected in a series loop adapted to generate a recirculating oscillatory signal of substantially constant amplitude at said frequency of least attenuation of said filter, the period of said signal being short compared to the delay time of said delay means, a discriminator circuit coupled to said loop for generating a signal proportional to the instantaneous deviation from said frequency of least attenuation of the frequency at the point of coupling to said loop, a signal adding circuit, means for supplying output from said discriminator to a first input of said signal adding circuit, means for supplying the signal to be integrated to a second input of said signal adding circuit, and means for supplying output from said signal adding circuit to the input of said frequency changing means, said frequency changing means being adapted to cause the frequency of a signal passing therethrough to shift by an amount proportional to the instantaneous amplitude of a signal appled thereto, said discriminator and said signal adding circuit comprising a degenerative feedback loop tending to reduce the frequency deviation at said point of coupling to said loop.

10. A system for integrating a composite video signal which includes a periodically recurrent series of pulses, said integrating system comprising a delay line having a delay time equal to the interval between successive pulse series, a band-pass filter, an amplifier, a limiter circuit, and a frequency modulator, the aforementioned elements being connected in a series loop, said series loop having a substantially constant natural frequency of oscillation, the period of said oscillation being short compared to the delay time of said delay line, a discriminator circuit coupled to said loop at a point following said band-pass filter, said discriminator circuit being operative to generate a signal proportional in amplitude to the instantaneous deviation from said natural frequency of oscillation of the frequency at the point of coupling to said loop, means for additively combining the output of said discriminator and the signal to be integrated, means for supplying output from said signal combining means to the input of said frequency modulator to control the operation thereof, said discriminator and said signal combining means forming a low gain degenerative feedback loop tending to reduce the frequency deviation at said point of coupling to said loop, and means for deriving an integrated signal from the output of said discriminator circuit.

11. A system for integrating a composite video signal which includes a periodically recurrent series of pulses, said system comprising a first mixer, a first band-pass filter, an amplifier, a second mixer, a second band-pass filter and a delay line, the aforementioned elements being coupled in a closed series loop in the order recited, said series loop having a substantially constant natural frequency of oscillation, the period of said oscillation being short compared to the delay time of said delay line, a first source of oscillatory signals coupled to said second mixer, said second mixer being operative to generate a beat signal having an instantaneous frequency equal to the sum of the frequency of the signal from said first source and the instantaneous frequency of the signal in the output of said amplifier, the frequency of said beat signal falling within the passband of said second band-pass filter, a second source of oscillatory signals coupled to said first mixer, said second mixer being operative to generate a second beat signal having an instantaneous frequency equal to the difference between the instantaneous frequency of the signal in the output of said delay line and the frequency of said second source, said second beat frequency lying within the passband of said first band-pass filter, said second source having an undeviated frequency equal to the frequency of said first source, a discriminator circuit coupled to the output of said first band-pass filter, said discriminator circuit being operative to generate a signal proportional in amplitude to the instantaneous deviation from said natural frequency of oscillation of the frequency of the signal in the output of said second filter, means for additively combining the output of said discriminator and said signal to be integrated, means for supplying output from said signal combining means to said second source to control the frequency generated thereby, said discriminator and said signal combining means forming a degenerative feedback loop having a gain less than unity.

12. An integrating system as in claim 11 wherein said second source of oscillatory signals comprises a frequency modulator coupled to said first source of oscillatory signals.

13. A system for integrating a composite video signal which includes a periodically recurrent series of pulses, said system comprising a first mixer, a first band-pass filter, an amplifier, a second mixer, a second band-pass filter and a delay line, the aforementioned elements being coupled in a closed series loop in the order recited, said series loop having a substantially constant natural frequency of oscillation, the period of said oscillation being short compared to the delay time of said delay line, a first oscillator coupled to said second mixer, said second mixer being operative to generate a beat signal having an instantaneous frequency equal to the sum of the frequency of the signal from said first oscillator and the instantaneous frequency of the signal in the output of said amplifier, the frequency of said beat signal falling within the passband of said second band-pass filter, a deviable oscillator coupled to said first mixer, said second mixer being operative to generate a second beat signal having an instantaneous frequency equal to the difference between the instantaneous frequency of the signal in the output of said delay line and the frequency of said deviable oscillator, said second beat frequency lying within the passband of said first band-pass filter, said deviable oscillator having an undeviated frequency equal to the frequency of said first oscillator, a discriminator circuit coupled to the output of said first band-pass filter, said discriminator circuit being operative to generate a signal proportional in amplitude to the instantaneous deviation from said natural frequency of oscillation of the frequency of the signal in the output of said second filter, a signal adding circuit, means for supplying output from said discriminator to a first input of said signal adding circuit, means for supplying said signal to be integrated to a second input of said signal adding circuit, means for supplying output from said signal adding circuit to said deviable oscillator to control the frequency thereof, said discriminator and said signal adding circuit forming a degenerative feedback loop having a gain less than unity.

14. An integrating system as in claim 13, said system further comprising frequency control means coupled to said first and second oscillators for maintaining the frequency of said first oscillator substantially equal to the undeviated frequency of said second oscillator.

15. A system for integrating a signal which includes a periodically recurrent series of pulses, said system comprising a delay line having a delay time equal to the time interval between corresponding pulses in successive pulse series, a feedback circuit coupling the output of said delay means to the input thereof, thereby to form a recirculating signal loop, means forming a part of said feedback loop for normally maintaining an approximately constant amplitude recirculating signal in said loop, said signal normally having predetermined, fixed frequencies at various points in said loop, first and second signal mixers forming a part of said feedback loop, said first signal mixer preceding and said second signal mixer following said delay line in said loop, an oscillator coupled to said first mixer, said first mixer being operative to alter the instantaneous frequency of the recirculating signal in said loop by the frequency of said first oscillator, signal generating means coupled to said second mixer, said second mixer being operative to alter the instantaneous frequency of the recirculating signal in a direction opposite to said first alteration in frequency and by an amount equal to the frequency of the signal from said generating means, said signal generating means being operative to generate a signal deviating in frequency from the frequency of said oscillator by an amount proportional to the amplitude of a signal applied thereto, frequency sensitive means coupled to said loop at a point following said second mixer and preceding said first mixer, said frequency sensitive means being operative to produce an output signal proportional in amplitude to the instantaneous deviation from said predetermined frequency of the frequency at the point of coupling, means for combining the output of said frequency sensitive means and said signal to be integrated, means for supplying said combined signal to said signal generating means to control the output frequency thereof, and means for deriving an output signal from the output of said frequency sensitive means.

16. A system for integrating a signal which includes a periodically recurrent series of pulses, said system comprising a delay line having a delay time equal to the time interval between corresponding pulses in successive pulse series, a feedback circuit coupling the output of said delay line to the input thereof, thereby to form a recirculating signal loop, means forming a part of said feedback loop for normally maintaining an approximately constant amplitude recirculating signal in said loop, said signal normally having predetermined fixed frequencies at various points in said loop, first and second signal mixers forming a part of said feedback loop, said first signal mixer preceding said delay line and said second signal mixer following said delay line in said loop, a first oscillator coupled to said first mixer, said first mixer being operative to alter the instantaneous frequency of the recirculating signal in said loop by frequency of said first oscillator, a deviable oscillator coupled to said second mixer, said second mixer being operative to alter the instantaneous frequency of the recirculating signal in a direction opposite to said first alteration in frequency and by an amount equal to the frequency of said deviable oscillator, frequency sensitive means coupled to said lop at a point following said second mixer and preceding said first mixer, said frequency sensitive means being operative to produce an output signal proportional in amplitude to the instantaneous deviation from said predetermined frequency of the frequency at the point of coupling, means for combining the output of said frequency sensitive means and said signal to be integrated, means coupling said signal combining means to said deviable oscillator to control the frequency thereof, and means for deriving an output signal from said frequency sensitive means.

17. A system for intgerating a signal which includes a periodically recurrent series of pulses, said system comprising a delay line having a delay time equal to the time interval between corresponding pulses in successive pulse series, a feedback circuit coupling the output of said delay line to the input thereof, thereby to form a recirculating signal loop, means forming a part of said feedback loop for normally maintaining an approximately constant amplitude recirculating signal in said loop, said signal normally having predetermined fixed frequencies at various points in said loop, first and second signal mixers forming a part of said feedback loop, said first signal mixer preceding said delay line and said second signal mixer following said delay line in said loop, a first oscillator coupled to said first mixer, said first mixer being operative to alter the instantaneous frequency of the recirculating signal in said loop by frequency of said first oscillator, a deviable oscillator coupled to said second mixer, said second mixer being operative to alter the instantaneous frequency of the recirculating signal in a direction opposite to said first alteration in frequency and by an amount equal to the frequency of said deviable oscillator, a discriminator coupled to said loop at a point following said second mixer and preceding said first mixer, a filter circuit coupled to the output of said discrimantor, said filter having a relatively constant, low gain at frequencies above a selected relatively low frequency and a relatively high gain at frequencies below said selected frequency, means for additively combining the output of said filter circuit and said signal to be integrated, said signal combining means being coupled to said deviable oscillator to control the frequency thereof, and means for deriving an output signal from said discriminator.

18. A system for integrating periodically recurrent signals comprising a series loop including a delay means through which is passed a modulated carrier signal, means for recirculating said modulated carrier signal through the delay means and means for modifying said modulated carrier in accordance with the signal to be integrated, degenerative means associated with said loop for causing the intelligence feedback factor of said loop to have a value less than unity and means associated with said series loop for providing an output signal related to the modulation of said carrier signal.

19. A filter for passing input signals of one characteristic more readily than those of another characteristic, said filter comprising a signal delay means, means for modulating said input signals upon a carrier signal, means for causing said modulated carrier signal to be continuously recirculated through said delay means, means for sensing the modulation of said modulated carrier signal to produce a detected signal and means for combining said detected signal and said recirculating modulated carrier signal.

20. A sweep integrator system comprising a recirculating signal loop, said loop including a delay means for causing signals circulating in said loop to have a predetermined transit time around said loop, means associated with said loop for causing a signal at a substantially constant frequency to be circulated in said loop, means for causing a shift in frequency of said circulating signal proportional to the instantaneous amplitude of an applied signal, means coupled to said loop for generating a signal having an instantaneous amplitude proportional to the instantaneous frequency of said recirculating signal at the point of coupling, signal combining means coupled to said signal generating means and the source of said signals to be integrated and means coupling the output of said signal combining means to said frequency shifting means to control the operation of the latter.

21. A filter for passing input signals of one characteristic more readily than those of another characteristic, said filter comprising a signal delay means, means for frequency modulating a carrier signal by said input signals, means for causing said modulated carrier signal to be continuously recirculated through said delay means, means for sensing the frequency modulation of said modulated carrier signal to produce a detected signal, and means responsive to said detected signal for decreasing the frequency modulation of said modulated carrier signal.

References Cited in the file of this patent
UNITED STATES PATENTS

| | | |
|---|---|---|
| 2,426,187 | Earp | Aug. 26, 1947 |
| 2,446,244 | Richmond | Aug. 3, 1948 |
| 2,487,995 | Tucker | Nov. 15, 1949 |
| 2,532,546 | Forbes | Dec. 5, 1950 |